US010909117B2

(12) United States Patent
Simitsis et al.

(10) Patent No.: US 10,909,117 B2
(45) Date of Patent: Feb. 2, 2021

(54) MULTIPLE MEASUREMENTS AGGREGATED AT MULTIPLE LEVELS OF EXECUTION OF A WORKLOAD

(71) Applicant: Hewlett Packard Enterprise Development LP, Houston, TX (US)

(72) Inventors: Alkiviadis Simitsis, Santa Clara, CA (US); William K. Wilkinson, San Mateo, CA (US)

(73) Assignee: Micro Focus LLC, Santa Clara, CA (US)

( * ) Notice: Subject to any disclaimer, the term of this patent is extended or adjusted under 35 U.S.C. 154(b) by 598 days.

(21) Appl. No.: 15/034,356

(22) PCT Filed: Dec. 20, 2013

(86) PCT No.: PCT/US2013/076779
§ 371 (c)(1),
(2) Date: May 4, 2016

(87) PCT Pub. No.: WO2015/094312
PCT Pub. Date: Jun. 25, 2015

(65) Prior Publication Data
US 2016/0292230 A1 Oct. 6, 2016

(51) Int. Cl.
*G06F 16/00* (2019.01)
*G06F 16/2455* (2019.01)
*G06F 16/248* (2019.01)
*G06F 16/2453* (2019.01)
*G06F 16/21* (2019.01)

(52) U.S. Cl.
CPC ........ *G06F 16/2455* (2019.01); *G06F 16/217* (2019.01); *G06F 16/248* (2019.01); *G06F 16/24542* (2019.01)

(58) Field of Classification Search
CPC ......... G06F 17/30377; G06F 17/30463; G06F 17/30442; G06F 16/2455; G06F 16/24542; G06F 16/248; G06F 16/217
See application file for complete search history.

(56) References Cited

U.S. PATENT DOCUMENTS

| 5,963,936 | A | 10/1999 | Cochrane et al. |
| 5,982,186 | A * | 11/1999 | Buschbom ........... G01R 1/0735 324/755.05 |
| 6,593,862 | B1 | 7/2003 | Wong et al. |
| 7,409,321 | B2 | 8/2008 | Repucci et al. |

(Continued)

OTHER PUBLICATIONS

A grid workload Modeling Approach for Intelligent Grid, IEEE, Liu et al., (Year: 2009).*

(Continued)

*Primary Examiner* — Jean M Corrielus

(57) ABSTRACT

Described herein are techniques for identifying a path in a workload that may be associated with a deviation. A workload may be associated with multiple measurements of a plurality of metrics generated during execution of the workload. The multiple measurements may be aggregated at multiple levels of execution. One or more measurements may be compared to one or more other measurements or estimates to determine whether there is a deviation from an expected correlation. If determined that there is a deviation, a path can be identified in the workload that may be associated with the deviation.

14 Claims, 8 Drawing Sheets

(56) References Cited

U.S. PATENT DOCUMENTS

| | | | |
|---|---|---|---|
| 7,424,530 B2 | 9/2008 | Chagoly et al. | |
| 7,617,185 B2 | 11/2009 | Werner | |
| 7,660,823 B2 | 2/2010 | Clover | |
| 7,783,510 B1 | 8/2010 | Gilgur et al. | |
| 7,805,510 B2 | 9/2010 | Bansal et al. | |
| 7,817,563 B1 | 10/2010 | Buragohain et al. | |
| 7,996,378 B2 | 8/2011 | Wang et al. | |
| 8,028,055 B2* | 9/2011 | Duffield | H04L 12/14 709/223 |
| 8,122,050 B2 | 2/2012 | Mordvinov et al. | |
| 8,224,811 B2* | 7/2012 | Kuno | G06F 16/24542 707/718 |
| 8,321,805 B2 | 11/2012 | Tien et al. | |
| 8,452,756 B2 | 5/2013 | Anderson et al. | |
| 8,531,225 B1* | 9/2013 | Hussain | H03K 5/133 327/276 |
| 8,533,218 B2 | 9/2013 | Debrot et al. | |
| 8,554,699 B2 | 10/2013 | Ruhl et al. | |
| 8,572,068 B2* | 10/2013 | Graefe | G06F 16/24542 707/718 |
| 8,577,871 B2 | 11/2013 | Dageville et al. | |
| 8,596,385 B2* | 12/2013 | Benson | E21B 7/10 175/61 |
| 8,949,224 B2 | 2/2015 | Gupta | |
| 9,128,994 B2 | 9/2015 | Smolinski et al. | |
| 9,251,464 B1 | 2/2016 | Kellas-Dicks et al. | |
| 9,501,537 B2 | 11/2016 | Walter et al. | |
| 9,594,791 B2 | 3/2017 | Bell et al. | |
| 9,632,858 B2 | 4/2017 | Sasturkar et al. | |
| 9,852,186 B2* | 12/2017 | Herwadkar | G06F 16/24568 |
| 10,208,580 B2* | 2/2019 | Benson | E21B 47/12 |
| 10,307,060 B2* | 6/2019 | Tran | A61B 5/0013 |
| 2004/0111398 A1 | 6/2004 | England et al. | |
| 2004/0210563 A1 | 10/2004 | Zait et al. | |
| 2005/0102613 A1* | 5/2005 | Boukouvalas | G06F 16/24526 715/237 |
| 2006/0064426 A1 | 3/2006 | Barsness et al. | |
| 2006/0248401 A1 | 11/2006 | Carroll et al. | |
| 2006/0253471 A1 | 11/2006 | Wasserman | |
| 2007/0010998 A1 | 1/2007 | Radhakrishnan et al. | |
| 2008/0183865 A1 | 7/2008 | Appleby et al. | |
| 2009/0313634 A1 | 12/2009 | Nguyen et al. | |
| 2009/0327242 A1 | 12/2009 | Brown et al. | |
| 2009/0327852 A1 | 12/2009 | McGregor et al. | |
| 2010/0082125 A1 | 4/2010 | Pingel et al. | |
| 2010/0082517 A1 | 4/2010 | Schapker et al. | |
| 2010/0082599 A1* | 4/2010 | Graefe | G06F 17/30306 707/713 |
| 2010/0198806 A1* | 8/2010 | Graefe | G06F 16/24542 707/713 |
| 2010/0198807 A1* | 8/2010 | Kuno | G06F 17/30463 707/713 |
| 2010/0235349 A1 | 9/2010 | Kuno et al. | |
| 2010/0312762 A1 | 12/2010 | Yan et al. | |
| 2011/0055214 A1 | 3/2011 | Mui et al. | |
| 2011/0072411 A1 | 3/2011 | Cornell | |
| 2011/0082927 A1 | 4/2011 | Chambers et al. | |
| 2011/0119374 A1 | 5/2011 | Ruhl et al. | |
| 2011/0153603 A1 | 6/2011 | Adiba et al. | |
| 2011/0283260 A1 | 11/2011 | Bucuvalas | |
| 2011/0314403 A1 | 12/2011 | Yan | |
| 2012/0022707 A1 | 1/2012 | Budhraja et al. | |
| 2012/0072575 A1 | 3/2012 | King et al. | |
| 2012/0179713 A1 | 7/2012 | Stolte et al. | |
| 2012/0180108 A1 | 7/2012 | Siklos et al. | |
| 2013/0124714 A1 | 5/2013 | Bednar | |
| 2013/0185729 A1 | 7/2013 | Vasic et al. | |
| 2013/0191411 A1 | 7/2013 | Carlson et al. | |
| 2013/0212142 A1 | 8/2013 | Martinez Tieras | |
| 2013/0262443 A1 | 10/2013 | Leida et al. | |
| 2013/0268520 A1 | 10/2013 | Fisher et al. | |
| 2013/0343213 A1* | 12/2013 | Reynolds | H04L 43/045 370/252 |
| 2013/0346427 A1 | 12/2013 | Impink | |
| 2014/0095541 A1* | 4/2014 | Herwadkar | G06F 16/24568 707/774 |
| 2014/0149947 A1 | 5/2014 | Blyumen | |
| 2014/0278838 A1 | 9/2014 | Novak | |
| 2014/0279824 A1 | 9/2014 | Tamayo | |
| 2014/0324862 A1* | 10/2014 | Bingham | G06F 16/26 707/737 |
| 2015/0033084 A1 | 1/2015 | Sasturkar et al. | |
| 2015/0033086 A1 | 1/2015 | Sasturkar et al. | |
| 2015/0039555 A1* | 2/2015 | Rao | G06F 16/2379 707/607 |
| 2015/0089054 A1* | 3/2015 | Rizzi | H04L 43/045 709/224 |
| 2016/0246842 A1* | 8/2016 | Li | G06F 16/24532 |

OTHER PUBLICATIONS

"Database Query Monitor", Zoho Corporation, Oct. 23, 2008.

"Troubleshooting Best Practices for Developing Windows Azure Applications", Jan. 2012.

Chuang, K-T et al, "Feature-Preserved Sampling Over Streaming Data", Jan. 2009.

Fajardo, W et al, "Pattern Characterization in Multivariate Data Series Using Fuzzy Logic", Jul. 30, 2012.

Grust, T et al, "Observing SQL Queries in Their Natural Habitat", Oct. 11, 2012.

Mayer, W et al, "Model-based Debugging with High-level Observations", Jul. 12, 2004.

Mishra, C et al, "A Lightweight Online Framework for Query Progress Indicators", Feb. 10, 2007.

Shah, N et al, "Dynamically Measuring Statistical Dependencies in Multivariate Financial Time Series Using Independent Component Analysis", Mar. 30, 2013.

Georgia Koutrika, et al., "Mirror mirror on the wall, which query's fairest of them all?", 6th Biennial CIDR '13, Jan. 6-9, 2013, 4 pages.

* cited by examiner

MULTIPLE MEASUREMENTS AGGREGATED AT MULTIPLE LEVELS OF EXECUTION OF A WORKLOAD

REFERENCE TO RELATED APPLICATIONS

This application is related to International Patent Application No. PCT/US13/076796, filed on Dec. 20, 2013 and entitled "Generating a visualization of a metric at a level of execution", and International Patent Application No. PCT/US13/076784, filed on Dec. 20, 2013 and entitled "Discarding data points in a time series", both of which are hereby incorporated by reference.

BACKGROUND

Enterprises (e.g. business concerns, educational organizations, government agencies) can depend on reports and analyses of data. To generate the reports and analyses, workloads, such as queries, can be executed in an execution environment. For example, a query engine (e.g., HP Vertica) can execute a query over a database. Database query monitoring tools collect measurements of performance metrics (e.g., memory and CPU usage) while a query is executing. These metric measurements are often made available through log files or system tables. The metric measurements can be used to understand and diagnose query performance issues. Other metrics, such as network activity, can be collected as well.

BRIEF DESCRIPTION OF DRAWINGS

The following detailed description refers to the drawings, wherein.

DETAILED DESCRIPTION

Figure 1:
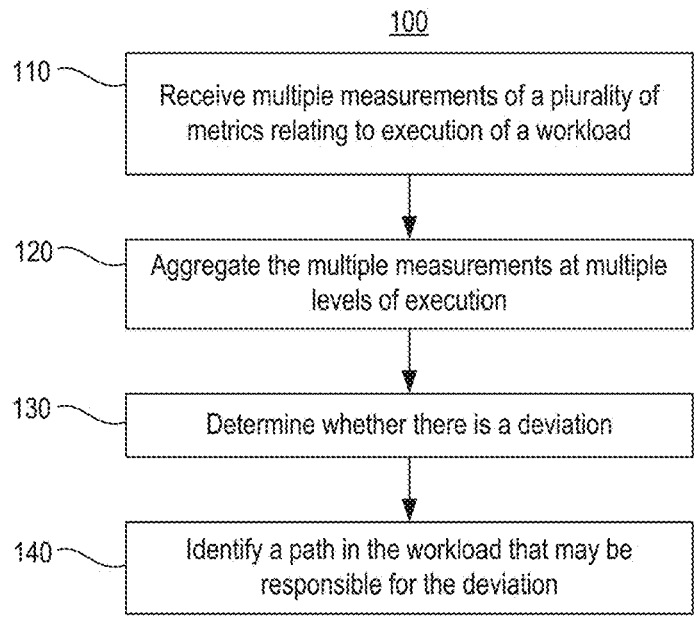
FIG. 1 illustrates a method of identifying a path in a workload that may be responsible for a deviation, according to an example.

Workloads, such as queries, may be executed in an execution environment. For example, a query engine (e.g., HP Vertica) can execute a query over a database. Most database systems include monitoring tools that collect performance metrics for individual queries. These metrics are often low-level metrics that may be incomprehensible to a typical user. Moreover, a long-running query may result in tens or hundreds of thousands of metric measurements. These measurements may be even more numerous and complex if the query engine is a parallel database engine, such as HP Vertica. It is unreasonable to expect a user to comprehend thousands of low-level metrics and be able to understand how they relate to the user's query. Simply providing a high-level overview of the performance of the query is also inadequate as much of the information in the metrics may be lost in the abstraction to the higher level. Additionally, monitoring tools often do not collect all of the metrics that could impact query performance, such as network activity.

According to an embodiment implementing the techniques described herein, a path in a workload may be identified that may be responsible for deviant behavior (e.g., unexpected performance issues) demonstrated during execution of the workload. Multiple measurements of a plurality of metrics relating to execution of the workload in an execution environment may be received. The measurements may be received from database monitoring tools or from other sources. The multiple measurements may be aggregated at multiple levels of execution of the workload. Where the workload is a query, example levels of execution include a query level, a query phase level, a path level, a node level, a path level, and an operator level.

In one example, the measurements of a first metric at a first level may be compared to estimates of the first metric at the first level to determine whether the measurements deviate from the estimates by a threshold value. If determined that the measurements deviate from the estimates by a threshold value, a path in the workload that may be responsible for the deviation may be identified. For instance, the path may be identified based on examining metric measurements at lower levels to identify a logical operator or physical operator exhibiting deviant behavior. In another example, measurements of a first metric at a first level may be compared to measurements of a second metric at the same or a different level to determine whether there is a deviation from an expected correlation between the two metrics. If determined that there is a deviation from the expected correlation between the two metrics, a path in the workload that may be responsible for the deviation may be identified.

In either case, the identified path may be presented to a user via a visualization. The visualization may highlight the path, such as by highlighting the path in an execution plan for the workload. The visualization may also include additional information, such as a natural language explanation for the deviation. As a result, the techniques described herein may aid a user in analyzing, troubleshooting, and/or debugging a workload. Furthermore, the techniques described herein may reduce the amount of information to be presented to the user, so as to avoid information overload, and aid the user in focusing on potentially problematic portions of a workload. Additional examples, advantages, features, modifications and the like are described below with reference to the drawings.

FIG. 1 illustrates a method for identifying a path in a workload that may be responsible for a deviation, according to an example. Method 100 (and methods 200, 250, and 300) may be performed by a computing device, system, or computer, such as system 410 or computer 900. Computer-readable instructions for implementing any of the methods may be stored on a computer readable storage medium. These instructions as stored on the medium are referred to herein as "modules" and may be executed by a computer.

Figure 4:
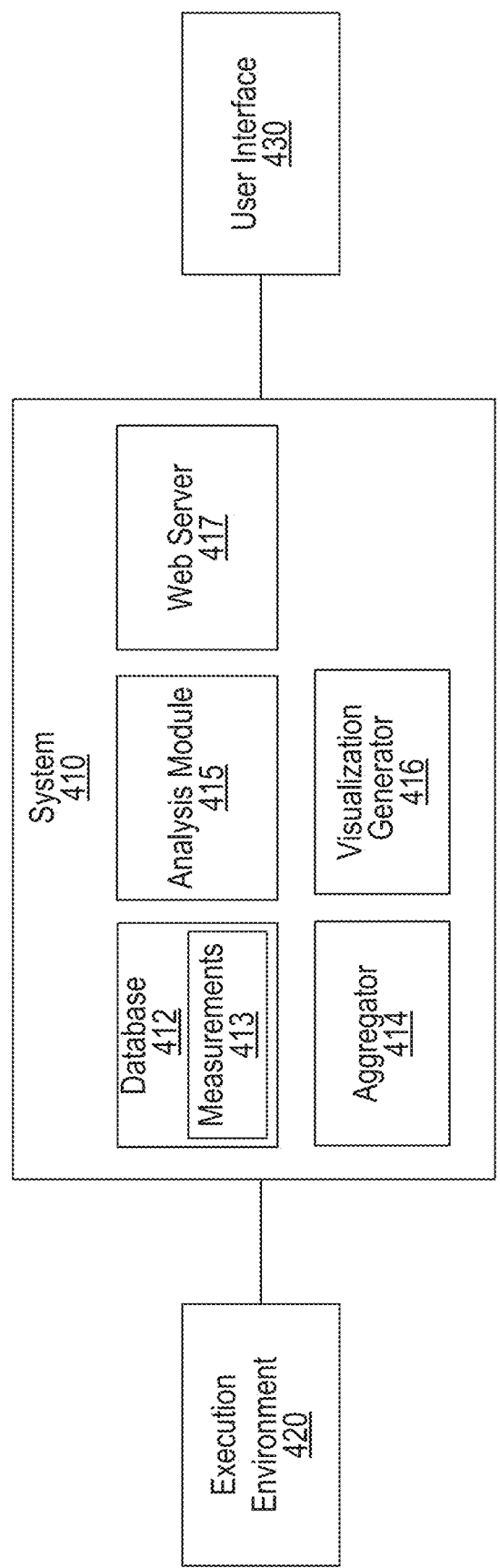
FIG. 4 illustrates a system for identifying a path in a workload that may be responsible for a deviation, according to an example.

Methods 100, 200, 250, and 300 will be described here relative to system 410 of FIG. 4. System 410 may include and/or be implemented by one or more computers. For example, the computers may be server computers, workstation computers, desktop computers, laptops, mobile devices, or the like, and may be part of a distributed system. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 310 may include one or more machine-readable storage media separate from the one or more controllers.

System 410 may include a number of components. For example, system 410 may include a database 412 for storing measurements 413, an aggregator 414, an analysis module 415, a visualization generator 416, and a web server 417. System 410 may be connected to execution environment 420 and user interface 430 via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing. The components of system 410 may also be connected to each other via a network.

Method 100 may begin at 110, where multiple measurements 413 of a plurality of metrics may be received. The multiple measurements may relate to execution of a workload in an execution environment 420. The multiple measurements may be stored in database 412.

Execution environment 420 can include an execution engine and a storage repository of data. An execution engine can include one or multiple execution stages for applying respective operators on data, where the operators can transform or perform some other action with respect to data. A storage repository refers to one or multiple collections of data. An execution environment can be available in a public cloud or public network, in which case the execution environment can be referred to as a public cloud execution environment. Alternatively, an execution environment that is available in a private network can be referred to as a private execution environment.

As an example, execution environment 420 may be a database management system (DBMS). A DBMS stores data in relational tables in a database and applies database operators (e.g. join operators, update operators, merge operators, and so forth) on data in the relational tables. An example DBMS environment is the HP Vertica product.

A workload may include one or more operations to be performed in the execution environment. For example, the workload may be a query, such as a Structured Language (SQL) query. The workload may be some other type of workflow, such as a Map-Reduce workflow to be executed in a Map-Reduce execution environment or an Extract-Transform-Load (ETL) workflow to be executed in an ETL execution environment.

The multiple measurements 413 of the plurality of metrics relate to execution of the workload. For example, the metrics may include performance metrics like elapsed time, execution time, memory allocated, memory reserved, rows processed, and processor utilization. The metrics may also include other information that could affect workload performance, such as network activity or performance within execution environment 420. For instance, poor network performance could adversely affect performance of a query whose execution is spread out over multiple nodes in execution environment 420. Additionally, estimates of the metrics for the workload may also be available. The estimates may indicate an expected performance of the workload in execution environment 420. Having the estimates may be useful for evaluating the actual performance of the workload.

The metrics (and estimates) may be retrieved from the execution environment 420 and received at system 410. The metrics may be measured and recorded at set time intervals by monitoring tools in the execution environment. The measurements may then be retrieved periodically, such as after an elapsed time period (e.g., every 4 seconds). Alternatively, the measurements could be retrieved all at once after the query has been fully executed. The metrics may be retrieved from log files or system tables in the execution environment.

At 120, the multiple measurements may be aggregated by aggregator 414 at multiple levels of execution. A level of execution as used herein is intended to denote an execution perspective through which to view the metric measurements. Where the workload is a query, example levels of execution include a query level, a query phase level, a path level, a node level, a path level, and an operator level. These will be illustrated through an example in which HP Vertica is the execution environment 420.

Monitoring tools in the HP Vertica engine collect metrics for each instance of each physical operator in the physical execution tree of a submitted query. The measurements of these metrics at the physical operator level correspond to the "operator level". Second, from a user perspective, the query execution plan is the tree of logical operators (referred to as paths in HP Vertica) shown by the SQL explain plan command. Each logical operator (e.g., GroupBy) is a path and comprises a one or more physical operators in the physical execution tree (e.g., ExpressionEval, Hash-GroupBy). Accordingly, the metric measurements may be aggregated at the logical operator level, which corresponds to the "path level". Third, a physical operator may run as multiple threads on a node (e.g., a parallel tablescan).

Additionally, because HP Vertica is a parallel database, a physical operator may execute on multiple nodes. Thus, the metric measurements may be aggregated at the node level, which corresponds to the "node level".

Fourth, a phase is a sub-tree of a query plan where all operators in the sub-tree may run concurrently. In general, a phase ends at a blocking operator, which is an operator that does not produce any output until it has read all of its input (or, all of one input if the operator has multiple inputs, like a Join). Examples of blocking operators are Sort and Count. Accordingly, the metric measurements may be aggregated at the phase level, which corresponds to the "query phase level". Fifth, the metric measurements may be reported for the query as a whole. Thus, the metric measurements may be aggregated at a top level, which corresponds to the "query level".

Consequently, metric measurements as interpreted by aggregator 414 form a multi-dimensional, hierarchical dataset where the dimensions are the various levels of execution. The metrics may then be aggregated (rolled-up) at the operator level, the path level, the node level, the query phase level, and the query level.

Figure 2A:
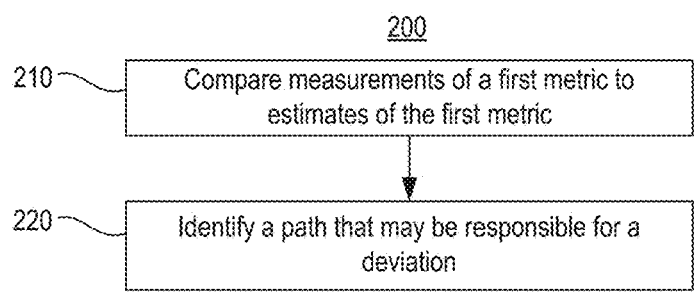
FIGS. 2a and 2b illustrate example methods of identifying a deviation.
Figure 2B:
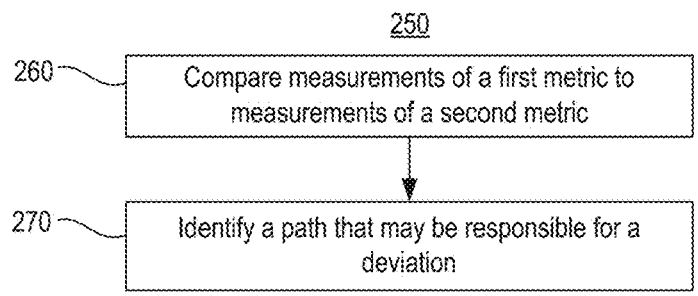

At 130, the analysis module 415 may determine whether there is a deviation. A deviation as used herein means unexpected performance exhibited during execution of the workload. The unexpected performance may relate to any of the metrics, such as unexpected elapsed time, execution time, memory allocated, memory reserved, rows processed, processor utilization, or network activity. There are various ways in which a deviation may be determined, such as illustrated by FIGS. 2a and 2b. Analysis module 415 may be configured to automatically check for deviations using these methods for any metric or combination of metrics at various levels of execution. At 140, the analysis module 415 may identify a path that may be responsible for the deviation. As will be described below, a path may be identified as potentially responsible for the deviation by drilling down through the levels of execution to determine which logical operator(s) and corresponding physical operator(s) are themselves associated with deviations at that level of execution.

Turning now to FIG. 2a, method 200 illustrates a method of determining whether there is a deviation and identifying a path that may be responsible for the deviation. At 210, analysis module 415 may compare measurements of a first metric with estimates of the first metric. This comparison may be performed for the measurements and the estimates at any of the levels of execution. Based on the comparison, it may be determined whether the measurements deviate from the estimates by a threshold value. The threshold value may indicate an amount of deviation that is deemed acceptable. For instance, the threshold value may be a percentage (e.g., <5% deviation allowed), a number (e.g., <10 rows deviation allowed), or a combination of the two (e.g., both <5% deviation and <10 rows deviation allowed). Using a combination can ensure that deviations are not identified for paths that have an insignificant effect on performance despite one of the threshold values being exceeded.

As an example, assume that the workload is a query, "rows processed" is the first metric, the threshold value is "<5%", and the level of execution is "query phase level". Thus, rows processed during execution of the query at the query phase level are compared to an estimate of rows that were expected to be processed during execution of the query at the query phase level. If 505K rows were processed but 500K rows were estimated, it is determined that there is no deviation since the measurement (505K rows) deviates from the estimate (500K rows) by less than 5%. On the other hand, if 505K rows were processed but 400K rows were estimated, it is determined that there is a deviation since the measurement (505K rows) deviates from the estimate (400K rows) by at least 5%.

At 220, if the analysis module 415 determines that the measurements deviate from the estimates by a threshold value, it may identify a path in the workload that may be responsible for the deviation. For example, upon determining that there is a deviation at a higher level (e.g., query phase level), the analysis module 415 may drill down to one or more lower levels (e.g., node level, path level, operator level) and compare measurements of the first metric at that lower level to estimates of the first metric at that level. Returning to the example in the previous paragraph, by drilling down to a lower level, it may be determined that the deviation between measurement (505K rows) and estimate (400K rows) at the query phase level is largely due to a deviation between measurement and estimate of rows at a particular one of the nodes processing the query, at a particular path (logical operator) executing in that query phase, and/or at a particular physical operator executing in that logical operator. As will be described with reference to FIGS. 3 and 5-8, the identified query phase, node(s), path(s), and/or physical operator(s) exhibiting deviations may be flagged and/or displayed for the user in a visualization.

Turning now to FIG. 2b, method 250 illustrates another method of determining whether there is a deviation and identifying a path that may be responsible for the deviation. At 260, analysis module 415 may compare measurements of a first metric with measurements of a second metric. This comparison may be performed for the measurements at any of the levels of execution, including at different levels for each metric. Based on the comparison, it may be determined whether there is a deviation from an expected correlation between the two metrics. An expected correlation may be an expected manner in which the measurements of the two metrics should relate to each other. For instance, there may be an expected correlation between rows processed and execution time. Such correlations may be determined by a module in the execution environment 420, such as an optimizer, since they depend on many variables and characteristics of the workload and the execution environment. The correlations may be accessed by system 410 and made available to analysis module 415.

As an example, assume that the workload is a query, "rows processed" is the first metric, "execution time" is the second metric, the level is "node level", and the correlation is that 100K rows should be processed in about 1 second. Thus, rows processed during execution of the query at the node level are compared to execution time at the node level to determine if there is a deviation from the expected correlation. If 500K rows were processed in about 5 seconds on a particular node, it is determined that there is no deviation since this is consistent with the expected correlation. On the other hand, if 500K rows were processed in 45 seconds on a particular node, it is determined that there is a deviation since there is a significant deviation from the expected correlation. Similar to method 200, a threshold value can be established for determining whether a deviation is significant.

At 220, if the analysis module 415 determines that there is a deviation from the correlation, it may identify a path in the workload that may be responsible for the deviation. For example, the analysis module 415 may drill down to one or more lower levels (e.g., path level, operator level) and compare measurements of the first metric at that lower level to measurements of the second metric at that level. Returning to the example in the previous paragraph, by drilling down to a lower level, it may be determined that the deviation from the correlation at the node level is largely due to a deviation between rows processed and execution time at a at a particular path (logical operator) executing in that query phase, and/or at a particular physical operator executing in that logical operator. As will be described with reference to FIGS. 3 and 5-8, the identified node(s), path(s), and/or physical operator(s) exhibiting deviations may be flagged and/or displayed for the user in a visualization.

Figure 3:
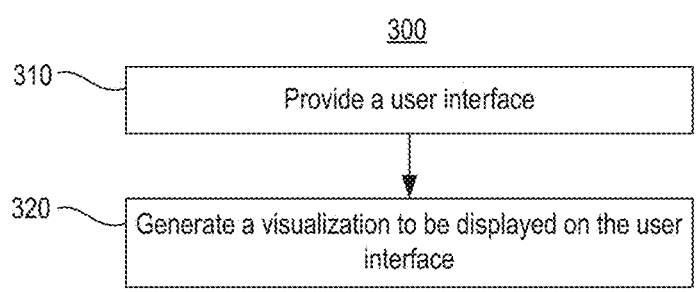
FIG. 3 illustrates a method of generating a visualization for a user interface, according to an example.

FIG. 3 illustrates a method of generating a visualization for a user interface, according to an example. Method 300 begins at 310, where a user interface is provided. The user interface 430 may be provided by web server 417 of system 410, and may be accessed by a user using a web browser or other application. The user interface 430 may be used to submit the workload to the execution environment 420. Alternatively, a workload executing in execution environment 420 may be accessed by entering identifying information, such as transaction and statement identifiers.

Figure 7:
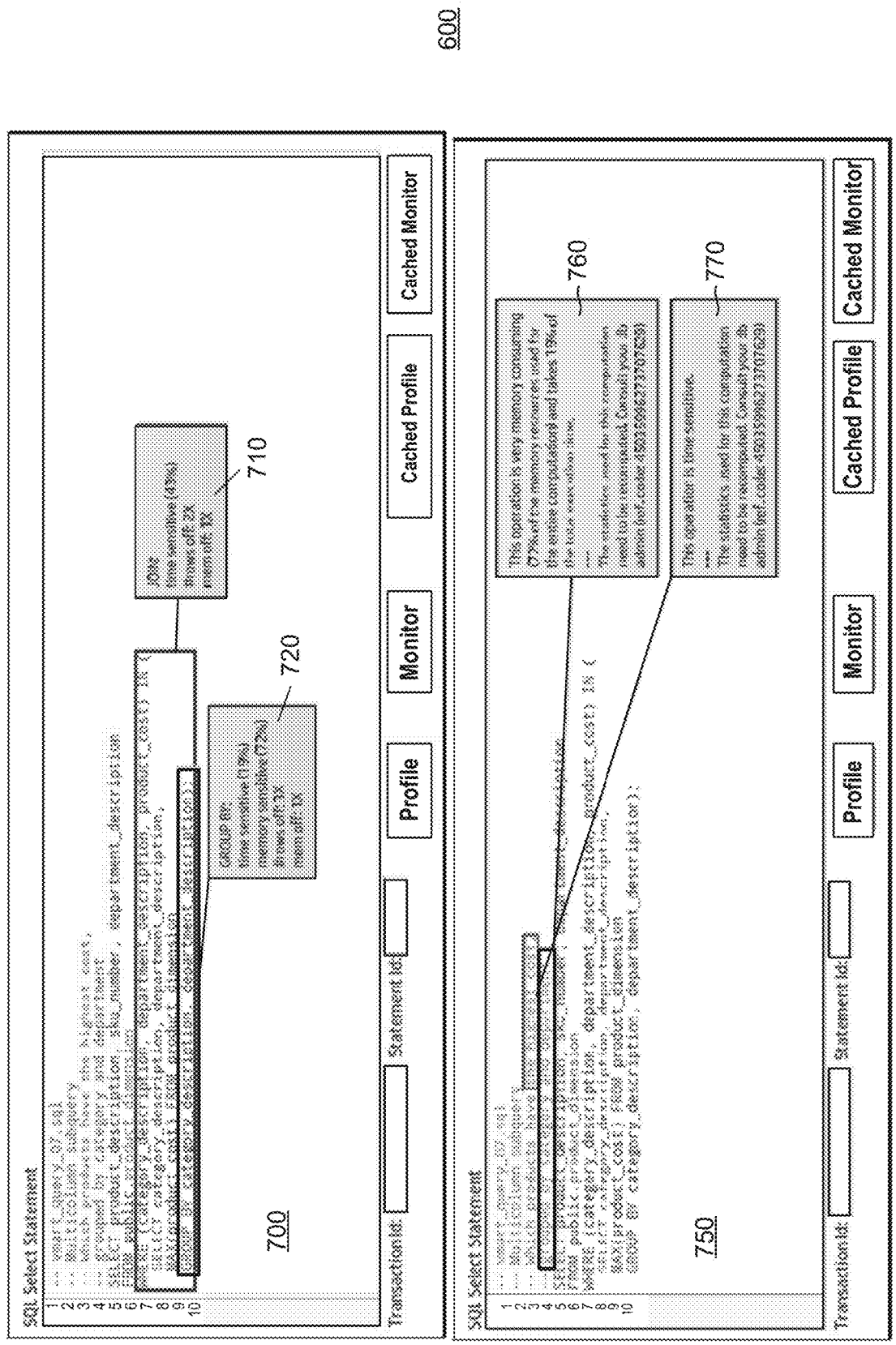
FIG. 7 illustrates example visualizations for identifying a path that may be responsible for a deviation, according to an example.
Figure 8:
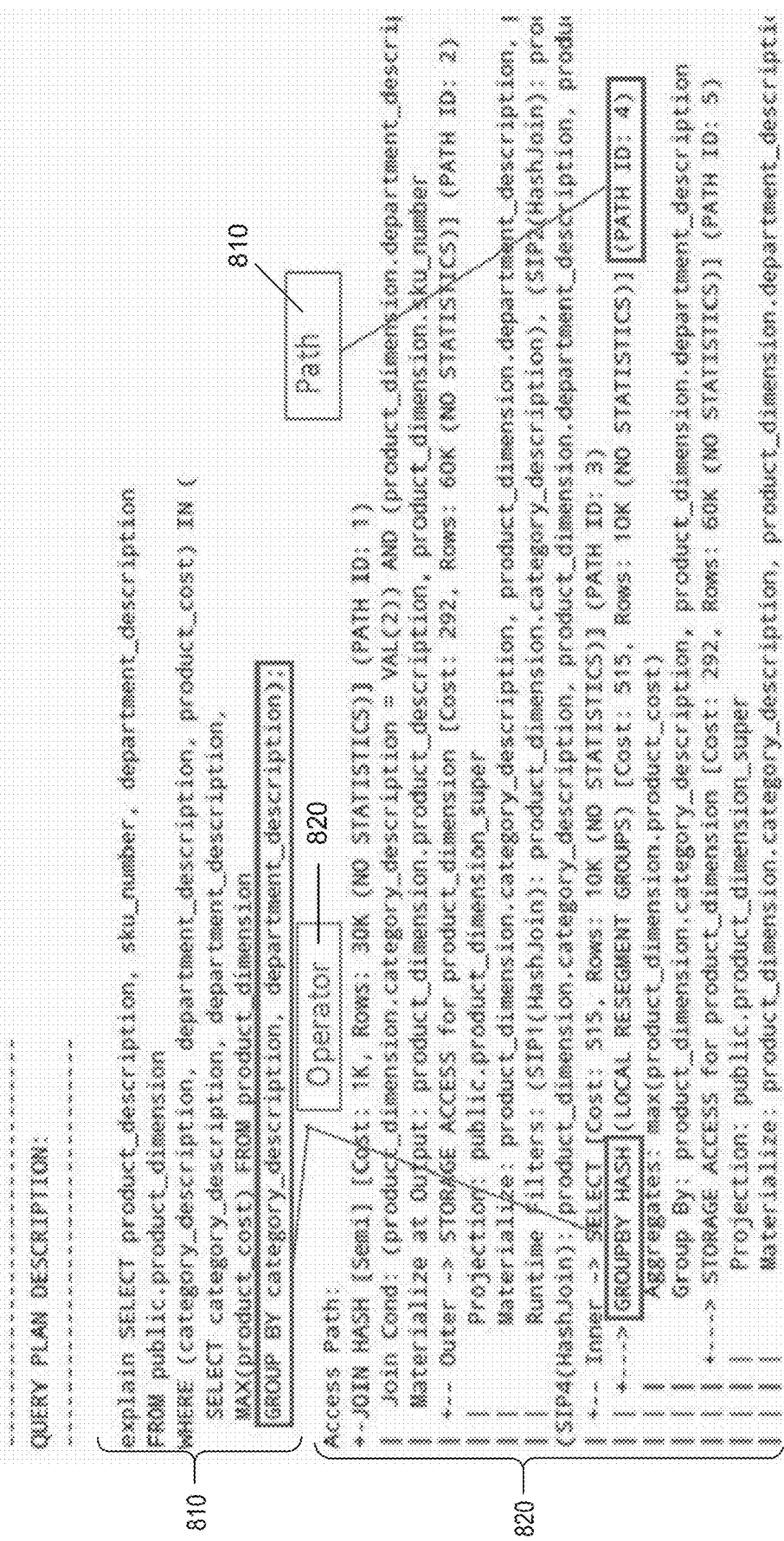
FIG. 8 illustrates how paths can be mapped to query language, according to an example.

The user interface 430 may allow selection of one or more of the metrics for display in the visualization. For example, the metrics may be selected in any of various ways, such as by clicking on a tab in the user interface 430, each tab representing a different metric. Alternatively, other selection options may be a dropdown menu, radio buttons, textual input, voice input, touch input, and the like. In addition, the user interface 430 may allow selection of one or more levels. The one or more levels may be selected in any of various ways as well, such as via a dropdown menu or by drilling down on a current displayed level via clicking on the displayed level. For instance, clicking on a path may drill down to the operator level for that path. Additionally, system 410 may provide user interface 430 with the explain plan (generated by the execution engine) and any events that occurred during execution (e.g., hash table overflow to disk). In some examples, some or all of this information can be incorporated into the visualization for display to the user, as illustrated in FIGS. 7 and 8.

At 320, a visualization to be displayed on the user interface may be generated. The visualization may identify a path in the workload associated with a deviation (such as identified in methods 100, 200, and 250). The visualization may include graphs, charts, and/or text. The visualization may be generated by visualization generator 416, which interfaces with aggregator 414 to obtain the metric measurements and estimates aggregated at the appropriate level. An example user interface 430 and example visualizations are described with reference to FIGS. 5-8.

Figure 5:
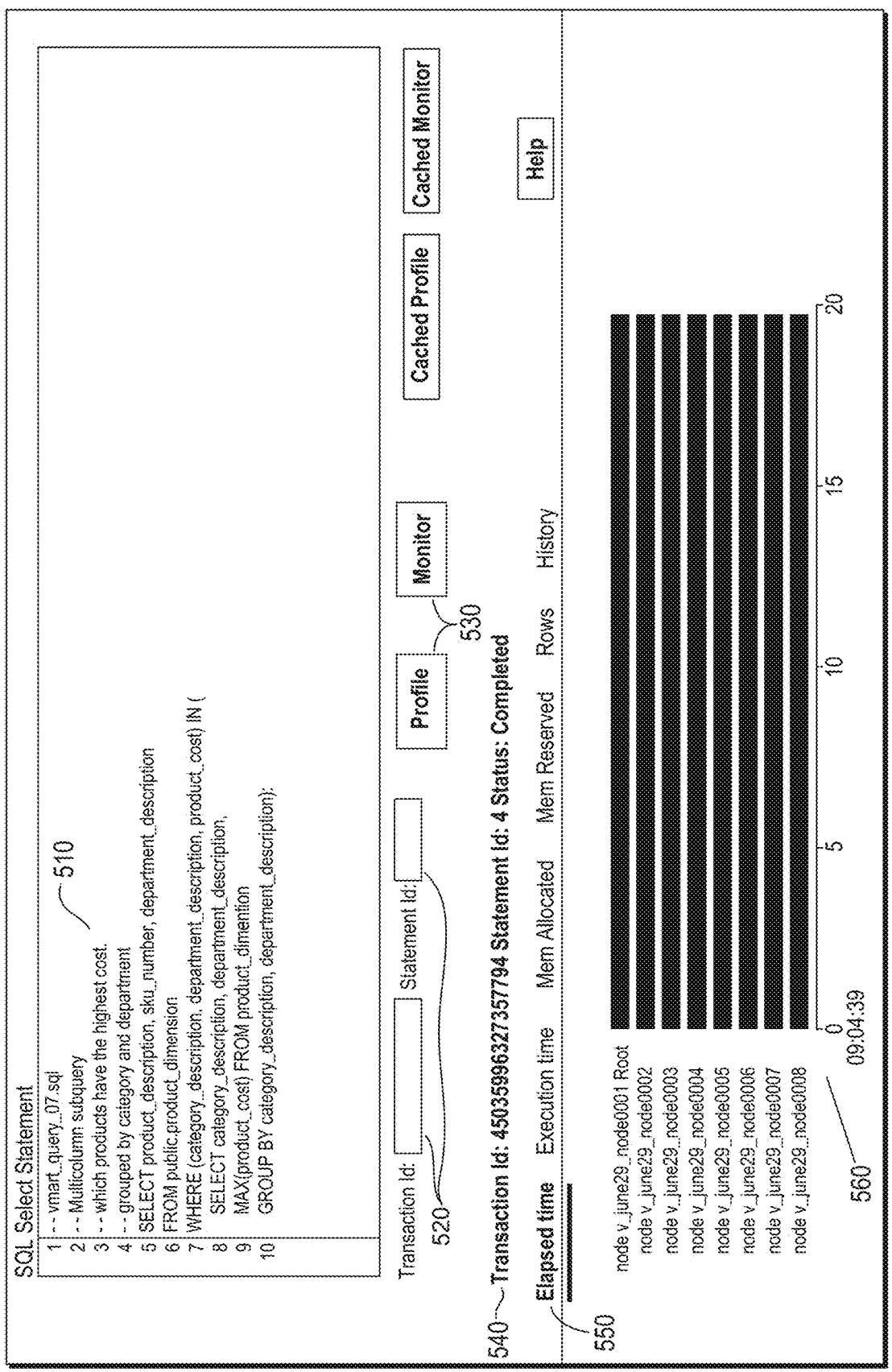
FIG. 5 illustrates a user interface for displaying a visualization, according to an example.

FIG. 5 illustrates a user interface 500 for displaying a visualization for a query executed in an execution environment, according to an example. Portion 510 is a text input box that allows a user to input an SQL query for submission to an execution environment (e.g., HP Vertica). Portion 520 includes two text input boxes for identifying a query already executing in the execution environment. The query can be identified using a transaction identifier or a statement identifier. The user interface 500 could be configured to accommodate other methods of identification as well, depending on the execution environment. Buttons 530 allow for specification of a time frame for monitoring the query. The "Profile" button will cause the system to wait for complete execution of the query and then retrieve and display a complete view of the query execution. The "Monitor" button will cause the system to monitor execution of the query and periodically update the visualization to include current metric measurements. An analyze operation may also be selected which will cause the system to analyze the execution of the query and identify one or more paths that may be responsible for a deviation in query performance, as described in FIGS. 1-4. The analyze operation can be selected in various ways, such as through a button, a menu, or the like. The analyze operation can also be a default or automatic operation. For example, it could be automatically performed for any query being monitored, and/or may be triggered when a user selects the profile or monitor buttons 530. Portion 510 can also be annotated to identify the one or more paths, as will be described with reference to FIGS. 7 and 8.

Portion 540 provides identification information for a query whose metrics are being currently displayed in portion 560. Portion 550 comprises various tabs, each tab corresponding to a metric. The metrics are elapsed time, execution time, memory allocated, memory reserved, rows processed, and history. The history metric represents a view of execution of the entire query up to the current time over one or more metrics. Portion 560 constitutes the representation of the selected metric (elapsed time) at the selected level of execution (node level). The representation is a bar graph representing elapsed time for each node. When the analyze operation has been selected, portion 560 can be updated to highlight metrics relevant to the one or more paths that may be responsible for a deviation.

Figure 6A:
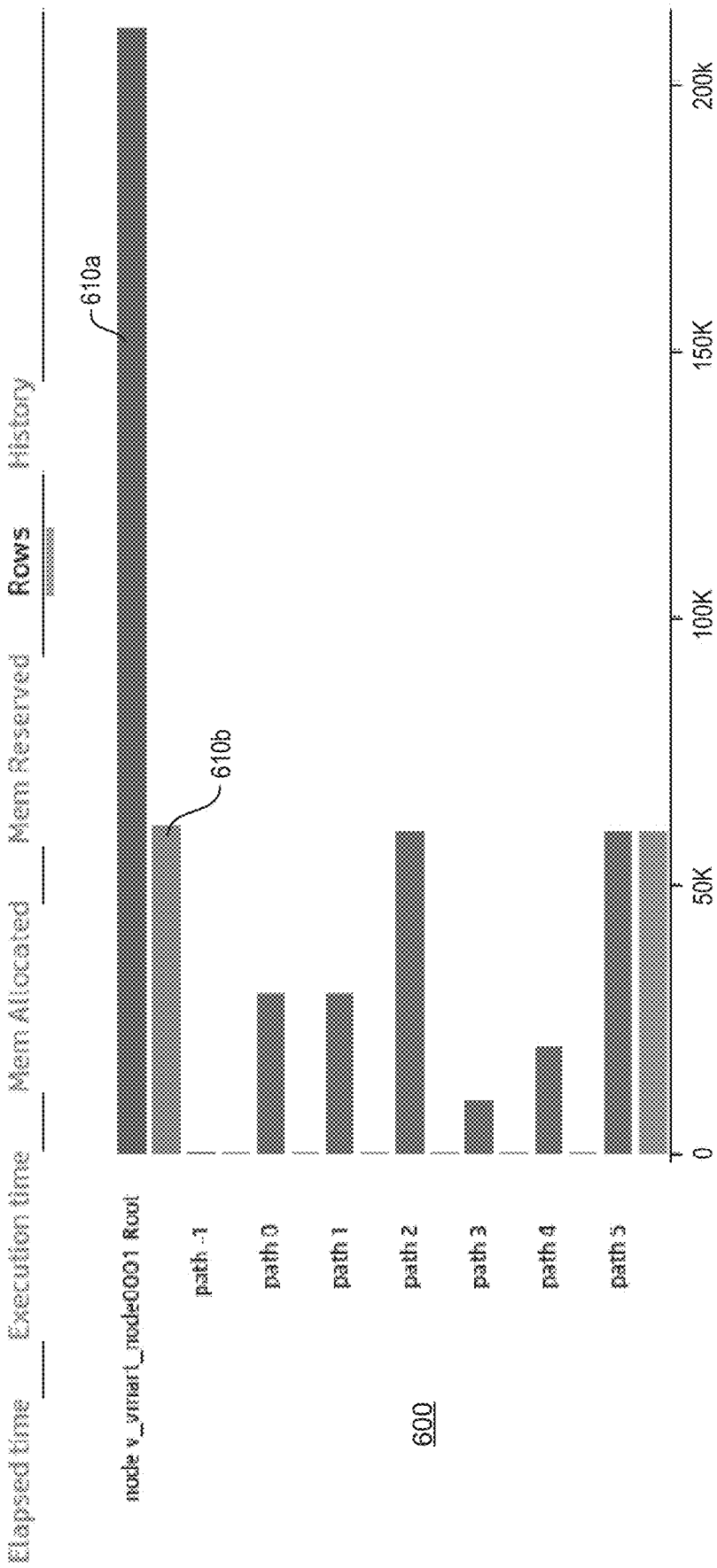
FIGS. 6a and 6b illustrate example visualizations and comparisons, according to an example.
Figure 6B:
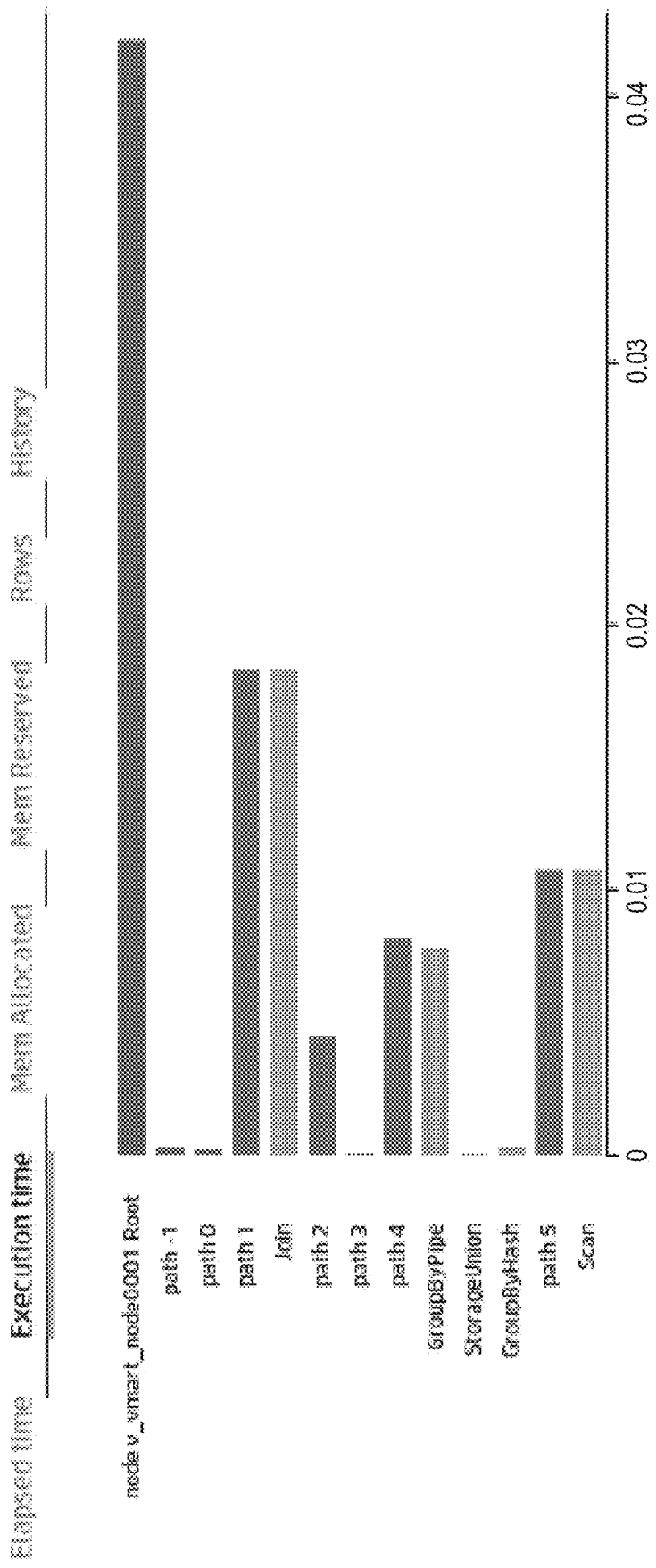

FIGS. 6a and 6b illustrate example visualizations and comparisons, according to an example. These visualizations represent example metric measurements and estimates for the SQL query in portion 510 of user interface 500, which is assumed to have been submitted for execution in execution environment 420 by system 410. The visualizations 600 and 650 could be displayed in portion 560 of user interface 500. Visualization 600 includes a bar chart showing an estimate of rows expected to be processed on node0001 (bar 610a) and a measurement of actual rows processed on node0001 (bar 610b). Due to a deviation between the estimate and the measurement, analysis module 415 looks at the same metric and estimate at the path level, which is also shown in visualization 600 for paths −1 through 5. By drilling down to the lower level, it is determined (and can be seen in the figure) that there is a deviation between metric and estimate for paths 0 through 4. However, instead of identifying each of paths 0 through 4 as paths that may be responsible for the deviation at the node level, analysis module 415 may perform further analysis to determine which paths likely have the most impact on the deviation. Visualization 650 of FIG. 6b illustrates this further analysis.

FIG. 6b illustrates the metric of execution time for node0001 at the node level and the path level. As can be seen, paths 1, 4, and 5 have the largest execution times. Thus, even though path 2 had the largest deviation between estimate and metric in visualization 600 (and thus might be assumed to be the path most likely to have the biggest impact on performance), visualization 650 reveals that path 2 did not consume as much execution time as other paths. Rather, paths 1 and 4 may be identified as impactful on the performance of the query due to having both high execution times and large deviations between rows processed and estimated rows processed.

While this analysis has been illustrated through visualizations 600 and 650, this analysis may be performed by analysis module 415 without the use of visualizations. The visualizations merely illustrate how this information could be presented to a user. In addition, this type of analysis may be performed for any of the metrics, such as comparing memory reserved to memory allocated. Analysis module 415 may be configured with multiple heuristic algorithms for comparing metrics and estimates at various levels to identify deviations between metrics and estimates as well as deviations from expected correlations.

FIG. 7 illustrates example visualizations for identifying a path that may be responsible for a deviation, according to an example. Visualizations 700 and 750 may be presented to the user via portion 510 of user interface 500. The query statement, here an SQL query, may be annotated to identify/highlight the identified paths for the user (the identified paths being the paths determined to be potentially responsible for any deviations).

Visualization 700 illustrates a visualization that may be useful for a database administrator or other skilled person. In particular, key operations (physical operators) in the paths may be identified. The key operations may be identified using the query explain plan, where the key operation in a path would be the first operation in the path. Additionally, statistics regarding execution of the operation may be provided, the statistics being based on the metric measurements and estimates. This is illustrated in visualization 700 via boxes 710 and 720. Box 710 identifies the Join operation and provides relevant execution statistics and box 720 identifies the GroupBy operation and provides relevant execution statistics. The skilled user may use this information to analyze the query, check the database schema, consider adding or dropping projections or indices, change resource pool configurations, tune the workload management policies being used, etc.

Visualization 750 illustrates a visualization that may be useful for non-technical people, such as business and data analysts. Nonetheless, the information provided in this visualization may also be useful to the skilled user, such as a database administrator. Here, boxes 760 and 770 provide information about the identified paths in a less technical, more user friendly manner. Essentially, the potential problems with the path are explained in prose. Furthermore, suggestions for fixing the problem are provided. For instance, it is suggested that the statistics used for the computation should be recomputed and the user is urged to consult the database administrator for assistance. Boxes 760 and 770 may be mapped to critical operators in the query statement, such as shown in visualization 700. Alternatively, boxes 760 and 770 may be mapped to relevant portions of a natural language description of the query, as shown here in visualization 750. The natural language description may be automatically generated using known techniques for generating natural language descriptions from query language.

Figure 9:
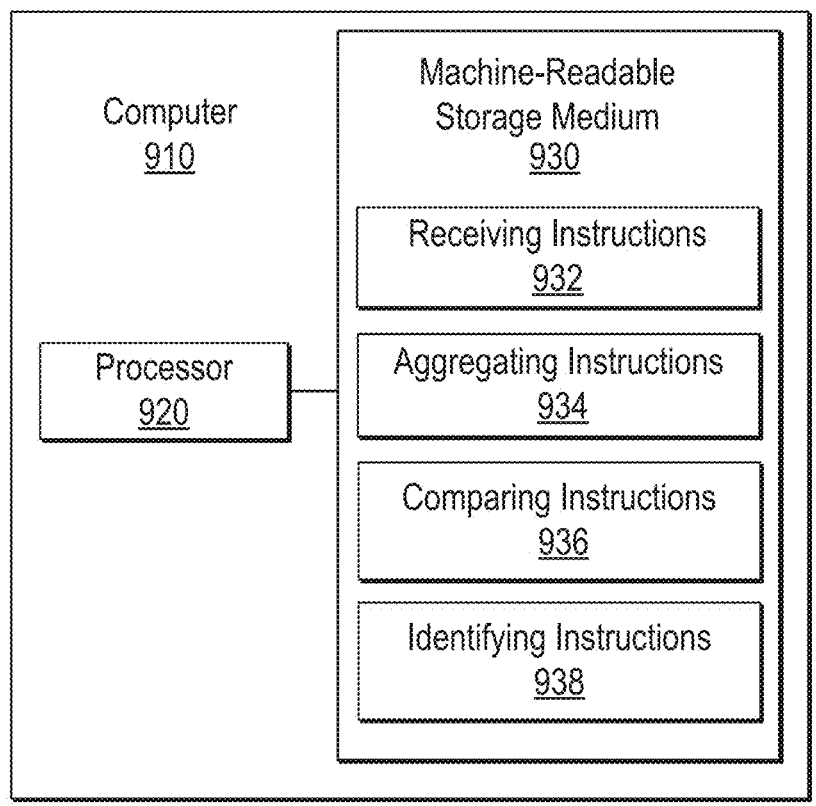
FIG. 9 illustrates a computer-readable medium for identifying a path in a workload that may be responsible for a deviation, according to an example.

FIG. 8 illustrates how paths can be mapped to query language, according to an example. Portion 810 is a query written in SQL. The query is the same query shown in portion 510 of user interface 500. Portion 820 is part of an explain plan for the query shown in 810. The explain plan was generated by a query engine, such as the query engine for HP Vertica. Given a path identified by one of the previously described techniques, the path can be located in the explain plan using the path identifier 810 (PATH ID: 4). The operator 820 (GROUPBY HASH) corresponding to the identified path 810 can then be mapped to the corresponding clause in the SQL query using a system table. This clause may then be highlighted in a visualization for benefit of the user, as illustrated in FIG. 7, FIG. 9 illustrates a computer-readable medium for generating a visualization of a metric at a level of execution, according to an example. Computer 910 may include and/or be implemented by one or more computers. For example, the computers may be server computers, workstation computers, desktop computers, laptops, mobile devices, or the like, and may be part of a distributed system. The computers may include one or more controllers and one or more machine-readable storage media, as described with respect to system 310, for example.

In addition, users of computer 910 may interact with computer 910 through one or more other computers, which may or may not be considered part of computer 910. As an example, a user may interact with computer 910 via a computer application residing on computer 910 or on another computer, such as a desktop computer, workstation computer, tablet computer, or the like. The computer application can include a user interface (e.g., touch interface, mouse, keyboard, gesture input device).

Computer 910 may perform methods 100, 200, 250, and 300, and variations thereof. Additionally, the functionality implemented by computer 910 may be part of a larger software platform, system, application, or the like. For example, computer 910 may be part of a data analysis system.

Computer(s) 910 may have access to a database. The database may include one or more computers, and may include one or more controllers and machine-readable storage mediums, as described herein. Computer 510 may be connected to the database via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

Processor 920 may be at least one central processing unit (CPU), at least one semiconductor-based microprocessor, other hardware devices or processing elements suitable to retrieve and execute instructions stored in machine-readable storage medium 930, or combinations thereof. Processor 920 can include single or multiple cores on a chip, multiple cores across multiple chips, multiple cores across multiple devices, or combinations thereof. Processor 920 may fetch, decode, and execute instructions 932-938 among others, to implement various processing. As an alternative or in addition to retrieving and executing instructions, processor 920 may include at least one integrated circuit (IC), other control logic, other electronic circuits, or combinations thereof that include a number of electronic components for performing the functionality of instructions 932-938. Accordingly, processor 920 may be implemented across multiple processing units and instructions 932-938 may be implemented by different processing units in different areas of computer 910.

Machine-readable storage medium 930 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 930 can be computer-readable and non-transitory. Machine-readable storage medium 930 may be encoded with a series of executable instructions for managing processing elements.

The instructions 932-938 when executed by processor 920 (e.g., via one processing element or multiple processing elements of the processor) can cause processor 920 to perform processes, for example, methods 100, 200, 250, and 300, and/or variations and portions thereof.

For example, receiving instructions 932 may cause processor 920 to receive multiple measurements of a plurality of metrics relating to execution of a workload over a database. The workload may be a query. Aggregating instructions 934 may cause processor 920 to aggregate the multiple measurements of the plurality of metrics at multiple levels of execution of the workload. The multiple levels of execution can include a query level, a query phase level, a node level, a path level, and an operator level. Comparing instructions 936 may cause processor 920 to compare measurements of a first metric at a first level to measurements of a second metric at the first level to determine whether there is a deviation from an expected correlation between the two metrics. Identifying instructions 938 may cause processor 920 to identify a path in the workload that may be responsible for the deviation if determined that there is a deviation from the expected correlation between the two metrics.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by a processing system:
    receiving multiple measurements of a plurality of metrics relating to execution of a workload over a database;
    aggregating the multiple measurements of the plurality of the metrics at multiple levels of execution of the workload, wherein aggregating the multiple measurements of the plurality of metrics comprises aggregating measurements of the multiple measurements of the plurality of metrics corresponding to a first level of the multiple levels to provide a first aggregated value and aggregating measurements of the multiple measurements of the plurality of metrics corresponding to a second level of the multiple levels other than the first level to provide a second aggregated value;
    comparing the first aggregated value to the second aggregated value to determine whether there is a deviation from an expected correlation between the first aggregated value and the second aggregated value; and
    between the first aggregated value and the second aggregated value, identifying a path in the workload as a candidate for causing the deviation.

2. The method of claim 1, wherein the path comprises a logical operation of the workload, the logical operation comprising a plurality of physical operations.

3. The method of claim 2, further comprising identifying a single physical operation of the plurality of physical operations as a candidate for the deviation.

4. The method of claim 1, wherein the workload comprises multiple paths.

5. The method of claim 1, wherein:
    the workload comprises a query;
    the first level comprises one of a query level corresponding to processing of the query as a whole, a path level comprising paths corresponding to individual logical operators of a tree of logical operators of a query execution plan, a phase level comprising phases corresponding to individual groupings of the logical operators of the query execution plan, and a node level corresponding to nodes executing the query in parallel; and
    the second level comprises a different one of the query level, the path level, the phase level and the node level.

6. The method of claim 5, wherein the first level comprises the path level, the method further comprising generating data representing a visualization comprising a representation of a given path of the paths in query language of the query.

7. The method of claim 6, wherein generating the data representing the visualization comprises:
    mapping the given path to a corresponding portion of an explain plan of the query; and
    mapping the corresponding portion of the explain plan to the query language using a system table.

8. The method of claim 6, wherein the visualization further represents an identification of an operation in the given path as a candidate for the deviation and statistics regarding execution of the operation.

9. The method of claim 6, wherein the visualization further represents a natural language explanation for the deviation.

10. The method of claim 1, wherein the plurality of metrics comprise at least two of an observed execution time, an observed rows processed, an observed processor utilization, or an observed network activity.

11. A system comprising:
    a processor; and
    a memory to store instructions that, when executed by the processor, cause the processor to:
        access a plurality of measurements of metrics stored in a database, wherein the plurality of measurements of metrics are collected by a query execution engine during execution of a query;
        aggregate the plurality of measurements of metrics at multiple levels of execution of the query, wherein aggregating the plurality of measurements of metrics comprises aggregating measurements of the plurality of measurements of metrics corresponding to a first level of the multiple levels to provide a first aggregated value and aggregating measurements of the plurality of measurements of metrics corresponding to a second level of the multiple levels other than the first level to provide a second aggregated value;
        compare the first aggregated value to the second aggregated value to determine whether there is a deviation from an expected correlation between the first aggregated value and the second aggregated value; and
        in response to determining that there is a deviation from the expected correlation between the first aggregated value and the second aggregated value, generate data representing a visualization identifying a path in the query as a candidate for causing the deviation.

12. The system of claim 11, further comprising a web server to provide a user interface to allow selection of one or more of the metrics and a level of the multiple levels.

13. The system of claim 11, wherein:
    the first level comprises one of a query level corresponding to processing of the query as a whole, a path level comprising paths corresponding to individual logical operators of a tree of logical operators of a query execution plan, a phase level comprising phases corresponding to individual groupings of the logical operators of the query plan, and a node level corresponding to nodes executing the query in parallel; and the second level comprises a different one of the query level, the path level, the phase level and the node level.

14. The system of claim 11, wherein the plurality of metrics comprise at least two of an execution time, a rows processed, a processor utilization, or a network activity.

* * * * *